United States Patent [19]

Kato et al.

[11] Patent Number: 4,661,571

[45] Date of Patent: Apr. 28, 1987

[54] PROCESS FOR THE PRODUCTION OF HEAT RESISTANT METHACRYLIC RESIN

[75] Inventors: Yasuyuki Kato; Masahiro Yuyama; Masahiko Moritani, all of Niihama; Susumu Iijima, Toyonaka, all of Japan

[73] Assignee: Sumitomo Chemical Company, Limited, Osaka, Japan

[21] Appl. No.: 780,903

[22] Filed: Sep. 27, 1985

[30] Foreign Application Priority Data

Oct. 2, 1984 [JP] Japan .................................. 59-207276
Oct. 12, 1984 [JP] Japan .................................. 59-214809

[51] Int. Cl.$^4$ .............................................. C08F 2/00
[52] U.S. Cl. .................................. 526/216; 526/213; 526/214; 526/329; 526/329.2; 526/329.3; 526/329.7
[58] Field of Search ............... 526/214, 329, 329.2, 526/329.3, 329.7, 213, 216

[56] References Cited

U.S. PATENT DOCUMENTS

| | | | |
|---|---|---|---|
| 3,364,182 | 1/1968 | Griffin | 526/214 |
| 3,758,447 | 9/1973 | Falk et al. | 526/214 |
| 3,950,314 | 4/1976 | Graff | 526/214 |
| 4,110,526 | 8/1978 | Hamada et al. | 526/214 |
| 4,239,875 | 12/1980 | Voronkova et al. | 526/227 |
| 4,536,523 | 8/1985 | Antonucci | 523/115 |

FOREIGN PATENT DOCUMENTS 59-15444  1/1984  Japan .

Primary Examiner—Joseph L. Schofer
Assistant Examiner—N. Sarofim
Attorney, Agent, or Firm—Birch, Stewart, Kolasch & Birch

[57] ABSTRACT

An improved process for the production of a methacrylic polymer having excellent heat resistance, which comprises radical-polymerizing a monomer or monomer mixture consisting of 80 to 100% by weight of methyl methacrylate and 0 to 20% by weight of a copolymerizable vinyl monomer in the presence of a polymerization initiator and one or more of specific chain transfer agents selected from the group consisting of (A) 2-mercaptoethyl alkanecarboxylate of the formula:

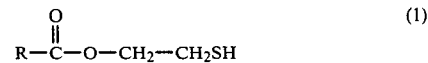

wherein R is an alkyl having 4 to 12 carbon atoms, (B) alkyl 3-mercaptopropionate of the formula:

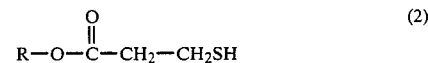

wherein R is an alkyl having 4 to 18 atoms. The methacrylic resin prepared by this invention has excellent heat resistance and can give formed products having excellent heat resistance (high heat distortion temperature) without increase of monomer content processing thereof.

11 Claims, No Drawings

PROCESS FOR THE PRODUCTION OF HEAT RESISTANT METHACRYLIC RESIN

The present invention relates to a process for the production of a heat resistant methacrylic resin. More particularly, the present invention relates to a process for the production of a methacrylic resin having excellent heat resistance by polymerizing a monomer or monomer mixture comprising predominantly methyl methacrylate by a radical polymerization reaction using a specific chain transfer agent.

PRIOR ART

Methacrylic resins have excellent transparency, gloss, weatherability and mechanical properties, and hence, are widely used as a material for preparing various formed products in different technical fields. Particularly, the methacrylic resins are largely used for the preparation of tail lamp lens for automobiles and lighting fixtures and the like. In these applications, the products are usually used at a place close to a heating source of a high temperature, and hence, the methacrylic resins should have a high heat resistance.

However, methacrylic resins are usually inferior in heat stability and tend to be decomposed during processing and additionally have a narrow range of temperature at which they can be formed. The inferior heat stability of methacrylic resins is mainly due to thermal decomposition of the methacrylic resins during processing. That is, since the resins are decomposed by heating during processing, the formed products contain a large amount of monomer. This increase in monomer content of the formed products is induced by depolymerization of the resins from the terminal of the molecular chain during processing with heating, by which the molecular weight of the resin is also lowered. Due to the increase of monomer content in the formed products, the formed products exhibit very low heat resistance (low heat distortion temperature), which may be induced the plasticizing effect of the monomer. Besides, the formed products exhibit inferior appearance such as silver streaks or splash marks. In order to eliminate these drawbacks, methyl methacrylate is usually copolymerized with an acrylic ester to improve the heat resistance thereof. However, when an acrylic ester is copolymerized, the resulting copolymer exhibits a lower heat distortion temperature, and hence, the amount of acrylic ester to be copolymerized is limited. On the other hand, undesirable heat decomposition of resin cannot sufficiently be prevented by copolymerization of such a small amount of acrylic ester.

It has also been proposed to incorporate a small amount of an antioxidant such as amines or phenols in order to prevent the undesirable heat decomposition of methacrylic resins. However, when such antioxidants are used, the methacrylic resins are undesirably colored upon heating.

There have also been known other methods, such as addition of mercaptans to methacrylic resin (cf. Japanese Patent Second Publication Nos. 14491/1963, 10756/1970 and 9392/1982 and Japanese Patent First Publication No. 15444/1984); and addition of sulfur compounds to methacrylic resin (cf. Japanese Patent Second Publication Nos. 13383/1968, 7629/1972 and 5215/1984, and Japanese Patent First Publication No. 36258/1976). Even by these methods, however, the heat decomposition is not sufficiently prevented, or these substances cannot be added in an adequate amount because of an occasionally undesirable smell to the resins or showing undesirable color when heated. It has also been proposed to add an aromatic mercaptan to the polymerization system at the end of suspension polymerization of methyl methacrylate (cf. Japanese Patent First Publication No. 20989/1976), but this method is also inferior because of the insufficient effect for prevention of heat decomposition or giving undesirable smell or color. Other known methods are a process of polymerization using a combination of a specific polymerization initiator and an aliphatic mercaptan (a chain transfer agent) (cf. Japanese Patent Second Publication No. 51849/1982) and a process of polymerization using a polymerization initiator under specific conditions (cf. Japanese Patent First Publication No. 15410/1984), but these methods are still insufficient for the prevention of the undesirable heat decomposition.

Thus, there has never been found any effective method the production of methacrylic resins which have excellent heat decomposition resistance without producing monomer during processing at a high temperature, i.e. without lowering the heat resistance (heat distortion temperature).

BRIEF DESCRIPTION OF THE INVENTION

Accordingly a main object of the present invention is to provide an improved process for the production of a methacrylic resin having excellent heat decomposition resistance, which does not increase monomer content in the formed product during processing at a high temperature, by radical polymerization using a specific chain transfer agent.

DETAILED DESCRIPTION OF THE INVENTION

The present invention provides a process for the production of a methacrylic polymer by radical polymerization of a monomer or monomer mixture consisting of 80 to 100% by weight of methyl methacrylate and 0 to 20% by weight of other copolymerizable vinyl monomer, which is characterized in that the polymerization reaction is carried out in the presence of one or more of chain transfer agents selected from the group consisting of (A) 2-mercaptoethyl alkanecarboxylate of the formula:

     (1)

wherein R is an alkyl group having 4 to 12 carbon atoms, (B) alkyl 3-mercaptopropionate of the formula:

     (2)

wherein R is an alkyl group having 4 to 18 carbon atoms. The chain transfer agent is used in an amount of 0.02 to 2 parts by weight to 100 parts by weight of the monomer or monomer mixture, and a polymerization initiator is also used together with the chain transfer agent.

The radical polymerization reaction can be conducted by any conventional polymerization method, such as suspension polymerization, emulsion polymerization and bulk polymerization and can also be done in a batch system or in a continuous system. The preferred polymerization method is suspension polymerization wherein the monomer or monomer mixture is suspended in an aqueous medium, by which a particulate polymer can be obtained.

When a monomer or monomer mixture is polymerized by radical polymerization, a chain transfer agent is usually used together with a polymerization initiator, wherein the chain transfer agent is bound at the terminal molecule the polymer. Generally, when methacylic resins are formed with heating the, depolymerization reaction proceeds at the terminal end of the polymer chain, by which the monomer content of the formed product is increased, which induces lowering of the heat resistance (heat distortion resistance) of the methacrylic resin. While the mechanism is not clear, the chain transfer agent of the formula (1) or (2) is effective for inhibiting an undesirable increase of monomer content in the formed products event by processing at a high temperature, and hence, the methacrylic resin prepared by the present invention can yield products having excellent heat resistance.

Besides, when the monomer or monomer mixture is suspension-polymerized in an aqueous medium, the monomer usually remains in the particulate polymer thus produced. The residual monomer lowers the heat resistance (heat decomposition resistance) of the formed product due to the plasticizing effect of the monomer, and hence, it is necessary to decrease the amount of residual monomer to as small as possible. It has unexpectedly been found that when the chain transfer agent of the formula (1) or (2) is used, the particulate polymer thus produced has an extremely small amount of residual monomer, and hence, the formed product prepared by processing the particulate polymer prepared by the process of the present invention has excellent heat resistance.

Thus, according to the present invention, methyl methacrylate monomer or monomer mixture is polymerized in the presence of the specific chain transfer agent of the formula (1) or (2) to give the desired particulate methacrylic resin having excellent heat resistance and further being capable of yielding a formed product having less monomer content. That is, the methacrylic resin of the present invention can yield a formed product having excellent heat deformation resistance without an increase of the monomer content even by processing at a high temperature.

The 2-mercaptoethyl alkanecarboxylate of the formula (1) can be prepared from 2-mercaptoethyl alcohol and an organic carboxylic acid. The alkyl moiety R in the formula (1) is not limited but should have 4 to 12 carbon atoms. Suitable examples of the alkanecarboxylate are 2-mercaptoethyl octanoate, 2-mercaptoethyl decanoate, 2-mercaptoethyl dodecanoate, and the like. When the group R has a carbon atom of not larger than 3, the 2-mercaptoethyl alkanecarboxylate demonstrates increased solubility in the aqueous solvent, and hence, is less effective as a chain transfer agent. On the other hand, when the group R has a carbon atom of larger than 12, the obtained particulate polymer has an undesirably large content of residual monomer.

The alkyl 3-mercaptopropionate of the formula (2) is not limited but should have 4 to 18 carbon atoms in the alkyl moiety of the alcoholic residue. Suitable examples thereof are n-octyl 3-mercaptopropionate, 2-ethylhexyl 3-mercaptopropionate, lauryl 3-mercaptopropionate, stearyl 3-mercaptopropionate, and the like. When the group R has a carbon atom of not larger than 3, the 3-mercaptopropionate shows increased solubility in the aqueous solvent, and hence, is less effective as a chain transfer agent. On the other hand, when the group R has a carbon atom larger than 18, the obtained particulate polymer has an undesirably large content of residual monomer.

The chain transfer agent in the present invention is usually used in an amount of 0.02 to 2 parts by weight, preferably 0.05 to 1 parts by weight, more preferably 0.1 to 0.8 part by weight, to 100 parts by weight of the monomer or monomer mixture consisting predominantly of methyl methacylate. When the chain transfer agent is used in an amount of less than 0.02 parts by weight, the obtained polymer has less heat decomposition resistance, and hence, the polymer undesirably yields a formed product having inferior heat resistance. On the other hand, when the chain transfer agent is used in an amount of more than 2 parts by weight, the polymer yields a formed product having undesirable coloring and further gives a formed product having inferior mechanical properties due to the lowering of the molecular weight of the polymer thus produced. Besides, the polymer exhibits an occasionally undesirable smell during the processing thereof with heating.

The 2-mercaptoethyl alkanecarbonate of the formula (1) and the alkyl 3-mercaptopropionate of the formula (2) can be used either alone or in combination, or a mixture of two or more thereof may also be used.

In the process of the present invention, a polymerization initiator is used together with the chain transfer agent of the formula (1) or (2). The polymerization temperature is not limited in the present invention, but the process is preferably carried out by suspension polymerization in an aqueous medium at a temperature of 60° to 120° C. Accordingly, the polymerization initiator includes one which can produce radicals at the temperature range. The polymerization initiator is not limited but includes, for example, azo compounds (e.g. 2,2'-azobis(2,4-dimethylvaleronitrile), azobisisobutyronitrile, dimethyl 2,2'-azobisisobutyrate, etc.), peroxy esters (e.g. tert.-butyl peroxy pivarate, tert.-butyl peroxy 2-ethylhexanoate, cumyl peroxy 2-ethylhexanoate, etc.), diacyl peroxides (e.g. di-(3,5,5-trimethylhexanoyl)peroxide, dilauroyl peroxide, etc.) and the like. These polymerization initiators may be used alone or in combination of two or more thereof. Particularly preferred polymerization initiators are azo compounds, because they can yield the desired particulate polymers having less residual monomer content and do not deteriorate the heat decomposition resistance of the polymer, when used together with the chain transfer agent of the formula (1) or (2) in the polymerization of the monomer or monomer mixture. The polymerization initiator is preferably used in an amount of 0.02 to 2 parts by weight to 100 parts by weight of the monomer or monomer mixture.

The methacrylic resin of the present invention comprises a polymer or copolymer prepared from 80 to 100% by weight of methyl methacrylate and 0 to 20% by weight of other copolymerizable vinyl monomer.

The vinyl monomer copolymerizable with methyl methacrylate includes, methacrylates (e.g. ethyl methacrylate, butyl methacrylate, cyclohexyl methacrylate, benzyl methacrylate, etc.), acrylates (e.g. methyl acrylate, ethyl acrylate, butyl acrylate, 2-ethylhexyl acrylate, etc.), methacrylic acid, acrylic acid, acrylonitrile, styrene, maleic acid, fumaric acid, or esters of these acids. These vinyl monomers may be used alone or in combination of two or more thereof. They are usually used in an amount of not more than 20% by weight based on the whole weight of the monomer mixture. When the amount of the copolymerizable vinyl monomer is over 20% by weight, the methacrylic resins thus obtained show undesirably less heat resistance (lower heat distortion temperature) and less mechanical properties.

The radical polymerization reaction is usually carried out by stirring the monomer or monomer mixture in the presence of a chain transfer agent as well as a polymerization initiator in a polymerization vessel. In the preferred feature, the reaction is carried out by suspension polymerization by stirring the monomer or monomer mixture in the presence of a chain transfer agent of the formula (1) or (2) as well as a polymerization initiator in an aqueous medium in a polymerization vessel. In order to prevent undesirable agglomeration or coalescence of the polymer, there may be used a particulating agent which is usually used in conventional suspension polymerization technique. The particulating agent includes, for example, protective colloidal substances such as gelatine, methyl cellulose, polyvinyl alcohol, polymethacrylates; and fine particle substances such as talc, kaolin, aluminum oxide, and the like.

The particulate polymer obtained by the suspension polymerization is washed with water, dehydrated, and dried. The polymer is formed into various shaped products suitable for the desired utilities, as it stands in the particle shape or after being pelletized by extruding with an extruder. The forming is carried out by conventional methods, such as extrusion molding, injection molding, or compression molding.

There may also be incorporated various additives such as coloring agents, ultraviolet absorbers, color stabilizers, plasticizers, lubricants, and various filling agents, which are optionally added at any appropriate step in the process.

The methacrylic resin prepared by the present invention has excellent transparency, gloss, surface hardness, weatherability and mechanical properties and further excellent heat resistance, i.e. excellent heat decomposition resistance during processing with heating. Accordingly, the methacrylic resin is very useful for preparing various formed products, particularly for products which require heat resistance.

The present invention is illustrated by the following Examples, but should not be construed to be limited thereto. In Examples, "part" and "%" mean "part by weight" and "% by weight" unless specified otherwise. The evaluation of the products in Examples 1 to 6 and Reference Examples 1 to 7 are done as follows:

The particulate polymer obtained by suspension polymerization is pelletized at 240° C. with an extruder provided with vent (VS 40, manufactured by Tanabe Plastic, Japan), and the pellets thus obtained are formed with an injection molding machine (M140/370-SJ, manufactured by Meiki Seisakusho, Japan) at 260° C. to give a transparent formed product. The heat distortion temperature of the formed product is measured after being annealed at 95° C. for 20 hours in a manner as described in ASTM D-648. The melt flow index (MI) of the polymer is measured under the conditions of 230° C., a load of 3.8 kg and for 10 minutes in a manner as described in ASTM D-1238. The residual monomer in the particulate polymer, pellets and formed product is measured by gas chromatography.

EXAMPLE 1

A monomer solution (6,000 g) consisting of methyl methacylate (98.5 parts), methyl acrylate (1.5 part), azobisisobutyronitrile (0.15 part) and 2-mercaptoethyl octanoate (0.4 part) is charged a 20 liter autoclave which contains an aqueous solution (12,000 g) of 1.2% sodium polymethacrylate (12 parts) and sodium phosphate (12 parts) in water (190 parts). The mixture is polymerized at 80° C. for 3 hours and further at 100° C. for 1 hour. The reaction product is separated, washed with water, dehydrated and dried to give a particulate polymer.

The particulate polymer thus obtained has a viscosity average molecular weight of 1,300. The particulate polymer is pelletized with an extruder, and the pellets thus prepared are formed with an injection molding machine.

The heat distortion temperature of the formed product, the melt flow index of the particulate polymer and the residual monomer content of the particulate polymer, pellets and formed product were measured. The results are shown in Table 1.

EXAMPLES 2 TO 6

In the same manner as described in Example 1, the polymerization and molding are performed by using the monomer solutions, polymerization initiators, and chain transfer agents as shown in Table 1 at the temperature as shown therein.

The residual monomer content and the heat distortion temperature of the formed products were measured likewise. The results are also shown in Table 1.

REFERENCE EXAMPLES 1 TO 7

For comparison purpose, the polymerization and molding are done by varying the kinds and amounts of the polymerization initiator and chain transfer agent and using various monomer solutions in the same manner as described in Example 1. The residual monomer content, the melt flow index and heat distortion temperature of the formed products were measured likewise. The results are also shown in Table 1.

TABLE 1

| Ex. No. | Monomer components (part) | Polymeriz. temp. (°C.) | Polymerization initiator Kind | Polymerization initiator Amount (part) | Chain transfer agent Kinds | Chain transfer agent Amount (part) | Residual monomer (%) Particulate polymer | Residual monomer (%) Pellets | Residual monomer (%) Formed product | Heat distort. temp. (°C.) | MI | Note |
|---|---|---|---|---|---|---|---|---|---|---|---|---|
| Ex. 1 | MMA 98.5 MA 1.5 | 80 | Azobisisobutyronitrile | 0.15 | 2-Mercaptoethyl octanoate | 0.4 | 0.20 | 0.16 | 0.30 | 108.5 | 2.1 | |
| Ex. 2 | MMA 97.5 MA 2.5 | 80 | Azobisisobutyronitrile | 0.15 | 2-Mercaptoethyl octanoate | 0.4 | 0.22 | 0.18 | 0.31 | 107.2 | 2.6 | |

TABLE 1-continued

| Ex. No. | Monomer components (part) | Polymeriz. temp. (°C.) | Polymerization initiator Kind | Amount (part) | Chain transfer agent Kinds | Amount (part) | Residual monomer (%) Particulate polymer | Pellets | Formed product | Heat distort. temp. (°C.) | MI | Note |
|---|---|---|---|---|---|---|---|---|---|---|---|---|
| Ex. 3 | MMA 97.5 MA 2.5 | 80 | t-butyl peroxy 2-ethylhexanoate | 0.3 | 2-Mercaptoethyl octanoate | 0.4 | 0.27 | 0.19 | 0.35 | 107.0 | 2.4 | |
| Ex. 4 | MMA 98.5 MA 1.5 | 80 | Octanoyl peroxide | 0.22 | 2-Mercaptoethyl octanoate | 0.4 | 0.40 | 0.20 | 0.40 | 107.8 | 3.0 | |
| Ex. 5 | MMA 98.5 MA 1.5 | 80 | Azobisisobutyronitrile | 0.15 | 2-Mercaptoethyl decanoate | 0.45 | 0.26 | 0.16 | 0.31 | 108.4 | 3.4 | |
| Ex. 6 | MMA 98.5 MA 1.5 | 80 | Azobisisobutyronitrile | 0.15 | 2-Mercaptoethyl dodecanoate | 0.5 | 0.20 | 0.18 | 0.30 | 108.5 | 3.7 | |
| Ref. Ex. 1 | MMA 98.5 MA 1.5 | 80 | Azobisisobutyronitrile | 0.15 | 2-Mercaptoethyl butyrate | 0.4 | 0.38 | 0.19 | 0.40 | 107.8 | 0.2 | Less moldability |
| Ref. Ex. 2 | MMA 98.5 MA 1.5 | 80 | Azobisisobutyronitrile | 0.15 | 2-Mercaptoethyl tetradecanoate | 0.6 | 0.63 | 0.23 | 0.69 | 105.6 | 5.1 | |
| Ref. Ex. 3 | MMA 98.5 MA 1.5 | 80 | Azobisisobutyronitrile | 0.15 | 2-Mercaptoethyl octanoate | 4 | 0.21 | 0.18 | 0.41 | 107.7 | >50 * | Inferior mechanical strength Unuseful |
| Ref. Ex. 4 | MMA 97.5 MA 2.5 | 65 | Azobisisobutyronitrile | 1.2 | 2-Mercaptoethyl octanoate | 0.01 | 0.43 | 0.30 | 1.04 | 103.3 | 0.1 | |
| Ref. Ex. 5 | MMA 97.5 MA 2.5 | 80 | Azobisisobutyronitrile | 0.15 | Laurylmercaptane | 0.35 | 0.31 | 0.18 | 0.65 | 104.4 | 2.0 | |
| Ref. Ex. 6 | MMA 97.5 MA 2.5 | 80 | t-butyl peroxy 2-ethylhexanoate | 0.3 | Octylmercaptane | 0.3 | 0.46 | 0.15 | 0.61 | 105.1 | 3.3 | |
| Ref. Ex. 7 | MMA 97.5 MA 2.5 | 80 | Octanoyl peroxide | 0.22 | Octylmercaptane | 0.3 | 0.53 | 0.16 | 0.63 | 105.0 | 3.5 | |

MMA: Methyl methacrylate,
MA: Methyl acrylate
*Unable to be measured

The properties of the products prepared in Examples 7 to 12 and Reference Examples 8 to 14 are evaluated as follows.

The particulate polymer is pressed with a pressing machine to give a plate. The plate (weight: Wo g) is charged in a hot air-circulating furnace and heated at 240° C. for one hour. Thereafter, the weight (W g) thereof is measured. The reduction rate in weight is calculated by the following equation:

Reduction rate in weight (%) = [(Wo − W)/Wo] × 100

The melt flow index (MI) is measured in the same manner as to the products in Examples 1 to 6 and Reference Examples 1 to 7. Moreover, the residual monomer content of the particulate polymer and the plate heat-treated at 240° C. for one hour is measured by gas chromatography.

The chain transfer agent can be detected so accurately to even in an amount of several ppm by gas chromatography, and it is confirmed that the resins prepared by the present invention contain no free chain transfer agent.

EXAMPLE 7

A monomer solution (6,000 g) consisting of methyl methacylate (98.5 parts), methyl acrylate (1.5 part), azobisisobutyronitrile (0.15 part) and 2-ethylhexyl 3-mercaptopropionate (0.4 part) is charged into 20 liter autoclave which contains an aqueous solution (12,000 g) of 1.2% sodium polymethacrylate (12 parts) and sodium phosphate (12 parts) in water (190 parts). The mixture is polymerized at 80° C. for 3 hours and further at 100° C. for 1 hour. The reaction product is separated, washed with water, dehydrated and dried to give a particulate polymer.

The particulate polymer thus obtained has a viscosity average molecular weight of 1,300. The particulate polymer is formed into a plate by pressing.

The reduction rate in weight of the plate after heating and the melt flow index of the particulate polymer were measured. The residual monomer content of the particulate polymer and the plate was also measured. The results are shown in Table 2.

EXAMPLES 8 TO 12

In the same manner as described in Example 7, except that the polymerization initiators and chain transfer agents as shown in Table 2 are used, the suspension-polymerization and forming a plate are conducted.

The reduction rate in weight, the melt flow index and the residual monomer content of the products were measured likewise. The results are also shown in Table 2.

REFERENCE EXAMPLES 8 TO 14

For comparison purposes, the polymerization and forming a plate are done by varying the kinds and amounts of the polymerization initiator and chain transfer agent in the same manner as described in Example 7. The reduction rate in weight, the melt flow index and the residual monomer content of the products were measured. The results are also shown in Table 2.

The formed product had a heat deformation temperature of 105.4° C., and the residual monomer contents of

TABLE 2

| Ex. No. | Polymerization initiator Kind | Amount (part) | Chain transfer agent Kinds | Amount (part) | Resid. monomer (%) Particul. polymer | Heated plate | Red. rate in wt. (%) | MI | Note |
|---|---|---|---|---|---|---|---|---|---|
| Ex. 7 | Azobisisobutyronitrile | 0.15 | 2-Ethylhexyl 3-mercaptopropionate | 0.4 | 0.28 | 0.67 | 0.72 | 2.7 | |
| Ex. 8 | Lauroyl peroxide | 0.3 | 2-Ethylhexyl 3-mercaptopropionate | 0.4 | 0.81 | 0.63 | 0.41 | 3.0 | |
| Ex. 9 | Octanoyl peroxide | 0.2 | n-Octyl 3-mercaptopropionate | 0.4 | 0.67 | 0.42 | 1.18 | 3.2 | |
| Ex. 10 | Azobisisobutyronitrile | 0.15 | Lauryl 3-mercaptopropionate | 0.6 | 0.51 | 0.61 | 0.65 | 5.2 | |
| Ex. 11 | Azobisisobutyronitrile | 0.15 | 2-Ethylhexyl 3-mercaptopropionate | 0.6 | 0.25 | 0.53 | 0.60 | 4.9 | |
| Ex. 12 | Azobisisobutyronitrile | 0.15 | 2-Ethylhexyl 3-mercaptopropionate | 0.2 | 0.35 | 0.77 | 0.88 | 1.1 | |
| Ref. Ex. 8 | Azobisisobutyronitrile | 0.15 | Isopropyl 3-mercaptopropionate | 0.2 | 0.33 | 2.78 | 6.88 | 1.6 | |
| Ref. Ex. 9 | Lauroyl peroxide | 0.3 | Isopropyl 3-mercaptopropionate | 0.2 | 0.86 | 2.75 | 5.25 | 1.4 | |
| Ref. Ex. 10 | Azobisisobutyronitrile | 0.15 | None | — | 0.04 | 3.20 | 9.35 | Not flow | |
| Ref. Ex. 11 | Lauroyl peroxide | 0.3 | None | — | 0.06 | 3.01 | 9.26 | Not flow | |
| Ref. Ex. 12 | Azobisisobutyronitrile | 0.15 | 2-Methoxybutyl 3-mercaptopropionate | 0.3 | 0.26 | 1.58 | 2.71 | 2.5 | |
| Ref. Ex. 13 | Azobisisobutyronitrile | 0.15 | 2-Ethylhexyl 3-mercaptopropionate | 0.01 | 0.14 | 3.10 | 7.21 | 0.1 | |
| Ref. Ex. 14 | Azobisisobutyronitrile | 0.15 | 2-Ethylhexyl 3-mercaptopropionate | 4 | 0.41 | 0.79 | 0.98 | >50 | Inferior mechanical strength unuseful |

REFERENCE EXAMPLE 15

To the particulate polymer (100 parts) obtained in Reference Example 10 is added 2-ethylhexyl 3-marcaptopropionate (0.4 part), and the mixture is well mixed with V type blender and is formed to a plate by pressing.

The reduction rate in weight of the plate after heating and the residual monomer rate thereof were measured. As a result, they were 7.26% and 2.95%, respectively.

REFERENCE EXAMPLE 16

To the particulate polymer (100 parts) obtained in Reference Example 5 is added 2-mercaptoethyl octanoate (0.4 part), and the mixture is mixed well with V type blender and then pelletized at 240° C. with an extruder provided with a bent (VS 40, manufactured by Tanabe Plastic, Japan). The pellets thus prepared are molded by injection molding in the same manner as described in Examples 1 to 7.

Various properties of the formed product were measured in the same manner as described in Examples 1 to 7. As a result, the heat deformation temperature of the formed product was 105.7° C., and the residual monomer contents of the pellets and the formed product were 0.20% and 0.51%, respectively. Besides, the formed product was transparent without color, but had a bad smell.

REFERENCE EXAMPLE 17

In the same manner as described in Reference Example 16 except that 2-ethylhexyl 3-mercaptopropionate (0.4 part) is used instead of 2-mercaptoethyl octanoate (0.4 part), there are prepared pellets and a formed product.

the pellets and the formed product were 0.23% and 0.56%, respectively. Besides, the formed product was transparent, but it had a pale yellow color and a bad smell.

The invention being thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for the production of a methacrylic polymer, by radical polymerization of a monomer or monomer mixture consisiting of 80 to 100% by weight of methyl methacrylate and 0 to 20% by weight of a copolymerizable vinyl monomer in the presence of a polymerization initiator and one or more chain transfer agents of a 2-mercaptoethyl alkanecarboxylate of the formula:

$$R-\overset{O}{\underset{\|}{C}}-O-CH_2-CH_2SH \qquad (1)$$

wherein R is an alkyl group having 4 to 12 carbon atoms, said chain transfer agent being present in an amount of 0.02 to 2 parts by weight to 100 parts by weight of the monomer or monomer mixture.

2. The process according to claim 1, wherein the polymerization initiator is an azo compound.

3. The process according to claim 2, wherein the polymerization initiator is present in an amount of 0.02 to 2 parts by weight to 100 parts by weight of the monomer or monomer mixture.

4. The process according to claim 1, wherein the chain transfer agent is a member selected from the group consisting of 2-mercaptoethyl octanoate, 2-mercaptoethyl decanoate and, 2-mercaptoethyl dodecanoate.

5. In a process for the production of a methacrylic polymer by radical polymerization of a monomer or monomer mixture consisting of 80 to 100% by weight of methyl methacrylate and 0 to 20% by weight of a copolymerizable vinyl monomer, the improvement which comprises carrying out the radical polymerization reaction by a suspension polymerization method in the presence of a polymerization initiator and one or more chain transfer agents of a 2-mercaptoethyl alkanecarboxylate of the formula:

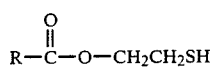
(1)

wherein R is an alkyl group having 4 to 12 carbon atoms, said chain transfer agent being present in an amount of 0.02 to 2 parts by weight to 100 parts by weight of the monomer or monomer mixture.

6. The process of claim 5, wherein the polymerization initiator is an azo compound.

7. The process of claim 6, wherein the polymerization initiator is present in an amount of 0.02 to 2 parts by weight to 100 parts by weight of the monomer or monomer mixture.

8. The process of claim 5, wherein the chain transfer agent is a member reelected from the group consisting of 2-mercaptoethyl octanoate, 2-mercaptoethyl decanoate, and 2-mercaptoethyl dodecanoate.

9. The process of claim 5, wherein the monomer or monomer mixture is suspended in an aqueous medium.

10. The process of claim 1, wherein the vinyl monomer is at least one member selected from the group consisting of methacrylate, acrylates, methacrylic acid, acrylic acid, acrylonitrile, styrene, maleic acid, fumaric acid, or esters of said acids.

11. The process of claim 5, wherein the vinyl monomer is at least one member selected from the group consisting of methacrylates, acrylates, methacrylic acid, acrylic acid, acrylonitrile, styrene, maleic acid, fumaric acid, or esters of said acids.

* * * * *